(12) United States Patent
Lim

(10) Patent No.: US 6,510,962 B1
(45) Date of Patent: Jan. 28, 2003

(54) PROGRAMMABLE AUTOMATIC PILL DISPENSER

(76) Inventor: James Lim, 299 Somerset Rd., Oakland, CA (US) 94611

(*) Notice: Subject to any disclaimer, the term of this patent is extended or adjusted under 35 U.S.C. 154(b) by 96 days.

(21) Appl. No.: 09/590,031

(22) Filed: Jun. 7, 2000

(51) Int. Cl.⁷ .............................................. B65B 59/00
(52) U.S. Cl. ................................ 221/15; 221/2; 221/3; 700/243
(58) Field of Search ........................... 221/2, 3, 15, 16, 221/89, 191, 194, 196, 258, 203, 265; 700/243; 368/10

(56) References Cited

U.S. PATENT DOCUMENTS

| | | | |
|---|---|---|---|
| 4,572,403 A | | 2/1986 | Benaroya |
| 4,573,606 A | | 3/1986 | Lewis et al. |
| 4,674,651 A | | 6/1987 | Seidmore et al. |
| 4,695,954 A | * | 9/1987 | Rose et al. ............... 364/413 |
| 4,748,600 A | * | 5/1988 | Urquhart .................. 368/10 |
| 4,785,969 A | * | 11/1988 | McLaughlin .............. 221/2 |
| 4,838,453 A | | 6/1989 | Luckstead |
| 4,911,327 A | * | 3/1990 | Shepherd et al. ........... 221/3 |
| 5,014,875 A | * | 5/1991 | McLaughlin et al. ........ 221/2 |
| 5,044,516 A | | 9/1991 | Hoar |
| 5,176,285 A | | 1/1993 | Shaw |
| 5,246,136 A | * | 9/1993 | Loidl ....................... 221/3 |
| 5,323,929 A | * | 6/1994 | Marlar ..................... 221/3 |
| 5,372,276 A | * | 12/1994 | Daneshvar ................. 221/2 |
| 5,564,593 A | * | 10/1996 | East, Sr. ................... 221/3 |
| 5,582,323 A | * | 12/1996 | Kurtenbach ................ 221/2 |
| 5,915,589 A | | 6/1999 | Lim |
| 5,971,594 A | * | 10/1999 | Sahai et al. ............ 364/479.12 |
| 6,021,918 A | * | 2/2000 | Dumont et al. ............. 221/2 |
| 6,145,697 A | * | 11/2000 | Gudish .................... 221/2 |
| 6,216,910 B1 | * | 4/2001 | Numerick .................. 221/7 |
| 6,304,797 B1 | * | 10/2001 | Shusterman ............... 700/243 |

\* cited by examiner

*Primary Examiner*—Khoi H. Tran

(57) ABSTRACT

A device that can be loaded with appropriate pills and programmed to automatically dispense the proper amount(s) and proper type(s) of pill(s) at the proper time(s) each day. The device includes a system for alerting the pill taker that pills have been dispensed, a system for providing voice messages to coach the pill taker to use the device and consume the pills, and a system for alerting an off-site caregiver when the pill taker has not responded as required or when there is a problem with the operation of the device. Major components of the device include a programmable timer (41), a pill-storage wheel (21), a cabinet (11), a compartment for storing bottles of pills (13), a push button to stop the alarm and release the pills (34), a pill-release gate (61), a compartment indicator template (51), an index gear (92), a battery (500), a pill-storage wheel actuation circuit (504), a pill alert LED and buzzer driver circuit (506), a voice message record and playback system (514), and an automatic telephone dialer system (510).

32 Claims, 7 Drawing Sheets

PROGRAMMABLE AUTOMATIC PILL DISPENSER

BACKGROUND—FIELD OF INVENTION

This invention relates to automatic pill dispensers, particularly to methods and devices which may be programmed to automatically dispense predetermined quantities and preselected types of pills at preset times.

BACKGROUND—PRIOR ART

The usage of pills to regain and maintain health has increased with the advancement of medical science. It is not unusual for a person to take more than one type of pill, each type in a different amount, at regular times each day. The task of correctly taking several different types of pills pose a challenge to many individuals, especially the elderly, the mentally infirm, and the obtunded who are more susceptible to memory problems. The improper taking of pills may be detrimental to health, and many emergency hospital admissions are attributable to improper observance of pill prescriptions.

The need for a device that will automatically dispense the proper pill(s) in the proper amount(s) at the proper time(s) each day and alert the user of the device to take the dispensed pill(s) is evident by the numerous devices described in the prior art. However, there are problems with the devices described in the prior art. For example, U.S. Pat. No. 4,573,606 to Lewis et al. (1986), U.S. Pat. No. 4,674,651 to Scidmore et al. (1987), U.S. Pat. No. 4,838,453 to Luckstead (1989), and 5,044,516 to Hoar (1991) describe automatic pill dispensers which have pill-storage wheels that are rotated constantly by electric clock motors. The constantly rotating pill-storage wheels of these devices successively move each pill-storage compartment of the wheel into a temporary alignment with a pill discharge outlet at a cyclical and fixed time interval. When a pill-storage compartment is in alignment with the pill discharge outlet, any pill stored in the compartment will fall by gravity through the outlet into a pill receptacle. The length of the fixed time interval of these devices cannot be changed without changing the gear drive ratio of the gear system driving the pill-storage wheel. Discharging pills at fixed time intervals makes these devices inefficient and difficult to use. For example, if one of these devices constantly rotates three pill-storage compartments past its pill discharge outlet in a 24-hour period, but only one pill is needed each day, then only one pill-storage compartment is used and two are kept empty each 24-hour day. In this case, two out of three pill-storage compartments have no use. In addition, during the process of loading pills into the pill storage wheel, specific compartments must be kept empty; this makes the loading procedure more complicated and susceptible to error.

Another problem with all of these devices is the possibility of an overdose of dispensed pills. This may result when a device dispenses pills into the pill receptacle, but the person taking the dispensed pills for some reason did not respond to the alert signal or just turned off the alert signal without taking the pills. If the dispensed pills are not removed from the pill receptacle and more pills are discharged into the receptacle, overdosing with harmful consequences may occur if the pill taker consumes all of the pills accumulated in the pill receptacle all at once.

Benaroya in U.S. Pat. No. 4,572,403 (1983), and Shaw in U.S. Pat. No. 5,176,285 (1993) attempt to overcome these deficiencies. The devices of Benaroya and Shaw include pill-storage wheels which rotate into position for discharging pills only when the pills are to be dispensed. A pill is not released from Shaw's pill-storage wheel unless a motorized mechanism is actuated to remove the pill, making an accumulation of discharged pills less likely. However, Shaw's device is complicated, difficult to load with pills and use, and uses motors and controls which are neither simple nor economical. Pills to be dispensed by Benoroya's device are not automatically discharged by gravity into a fixed or removable pill receptacle. The pills stay in the pill-storage wheel until the user tilts or turns the device upside down to dump out the pills. While this feature makes overdosing from an accumulation of discharged pills unlikely, the need to manipulate the device by tilting or turning it upside down and catching the pills before they fall on the floor makes its operation ackward and clumsy.

Also, all the above devices do not have a built-in secure compartment for storing the bottles of pills which are to be loaded into the pill-storage wheel. The bottles of pills need to be stored elsewhere, like a medicine cabinet, and obtained when reloading of pills is needed. The need to obtain the pills from another location is inefficient and inconvenient.

Another deficiency of all these devices is that some users, especially those suffering from senility or deterioration of mental function, may simply deactivate the pill alert signal as they would do when turning off an alarm clock, and forget to take the dispensed pills. In addition, there may be special instructions that the pill taker must follow in consuming the dispensed pills, such as taking the dispensed pills with plenty of liquids, or food, and the pill taker may forget these instructions. Also, the devices of Lewis et al. and Hoar have removable pill receptacles that must be replaced after the dispensed pills are taken, and an user may forget to replace the receptacle. Knowing when to refill the dispenser with pills is another problem with all of the devices. Also, a person monitoring the use of a dispenser must be close to the dispenser to make observations, and this could be inconvenient.

OBJECTS AND ADVANTAGES

Accordingly, the object of the present invention is to provide an improved programmable automatic pill dispenser without the deficiencies and disadvantages of the above mentioned devices; specifically, to provide a simple and reliable programmable automatic pill dispenser that has a pill-storage wheel which moves only at preset time(s), and has a built-in lockable storage compartment for bottles containing pills which are to be loaded into the pill-storage wheel. Still further objects and advantages are:

a) to provide a programmable automatic pill dispenser that reduces the possibility of the pill taker taking an improper accumulation of dispensed pills which may result in overdosing;

b) to provide a programmable automatic pill dispenser that has a system to record personal voice messages and to play these messages to coach the pill taker into properly taking the dispensed pills;

c) to provide a programmable automatic pill dispenser that has a system to alert an off-site caregiver when the pill taker has not taken the dispensed pill(s), or when there is a problem with the operation of the programmable automatic pill dispenser; and d) to provide a programmable automatic pill dispenser that is compact, and battery operated.

Additional objects and advantages will become apparent in studying the ensuing drawings and description.

SUMMARY

The present invention provides a system for automatically dispensing proper amount(s) of proper type(s) of pill(s) at proper time(s) each day and alerting a pill taker to consume the pills by:

1. Presetting a timer with time(s) of day that pill(s) need to be dispensed;
2. loading the compartments of a motorized pill storage-wheel with proper amount(s) and type(s) of pill(s) to be dispensed;
3. Moving the proper loaded compartment of the pill-storage wheel to align with a pill discharge outlet only when the timer arrives at each preset time;
4. Discharging the loaded pill(s) by gravity into a pill receptacle; and
5. issuing a visual and audible alarm to alert the pill taker to take the pill(s) in the pill receptacle.

The system also includes a lockable and built-in storage compartment for storing supply containers with pills that need to be dispensed, and a simple means to control the movement of the pill-storage wheel. The system may also include a system for providing voice messages to coach the pill taker on consuming the pills, a system for alerting an off-site caregiver when the pill taker has not responded as required or when there is a problem with the operation of the dispenser, and a system for alerting the need to reload the pill-storage wheel and the need to replace or recharge the battery.

REFERENCE NUMERALS FIGS. 1 to 10

11 cabinet
12 pill-storage wheel housing
13 store or storage compartment for bottles containing pills
14 pill discharge outlet
15 cylindrical wall of pill-storage wheel housing
16 hole for shaft of pill-storage wheel
17 hole for shaft of pill release gate
18 circular surface of pill-storage wheel housing
19 speaker grille
21 pill-storage wheel
22 vanes
23 outer cylinder wall
24 cylindrical cavity for timer
25 inner cylinder wall
26 cylinder base
27 hole through center of base and shaft
28 shaft
29 annular seat for compartment indicator template
32 hinges
33 door lock
34 push button to actuate pill release gate and stop alarm switch
35 LED indicator for alerting pill taker
36 LED indicator for refilling pill storage wheel
37 LED indicator for low battery
38 pill-storage compartment
39 pill-storage compartment (in position for discharging)
41 programmable timer
42 timer display
43 push buttons for setting timer
44 timer mount shaft
51 compartment indicator template
52 identifying indicia
53 hole for aligning pill loading indicator template
54 pin for aligning pill loading indicator template
61 pill-release gate
62 gate shaft
63 pinion gear
64 rack gear
65 rack guide
66 rack return spring
67 spring holder
68 stop alarm switch
71 removable pill receptacle
81 door
91 pill-storage wheel actuation spur gear
92 pill-storage wheel index gear
93 timer mount bracket
94 surface opposite to cylinder base 18
95 worm gear
96 rotary motor
97 motor interrupt switch
98 interrupt switch bracket
99 pill receptacle switch
500 battery
502 pill refill indicator circuit
504 pill-storage wheel actuation circuit
506 pill alert LED and buzzer driver circuit
508 pill alert duration timing circuit
510 emergency automatic telephone dialer system
512 pill alert buzzer
514 voice message #1 record and playback system circuit
516 voice message #1 duration timing circuit
518 voice message #2 record and playback system circuit
520 voice message #2 duration timing circuit
522 low battery detection circuit

DESCRIPTION OF PREFERRED EMBODIMENT

Figure 1:
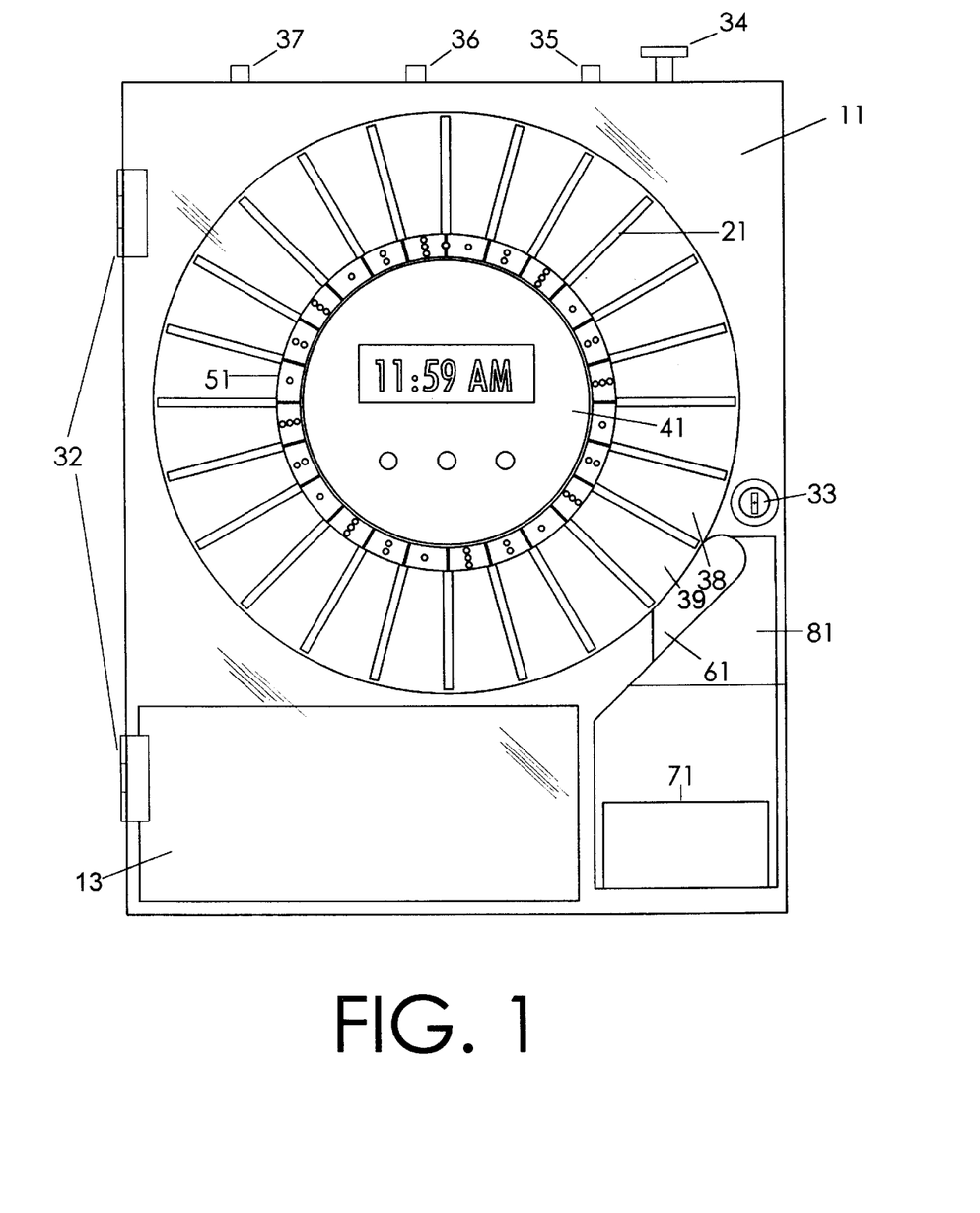
FIG. 1 is a plan front view of a preferred embodiment.
Figure 2:
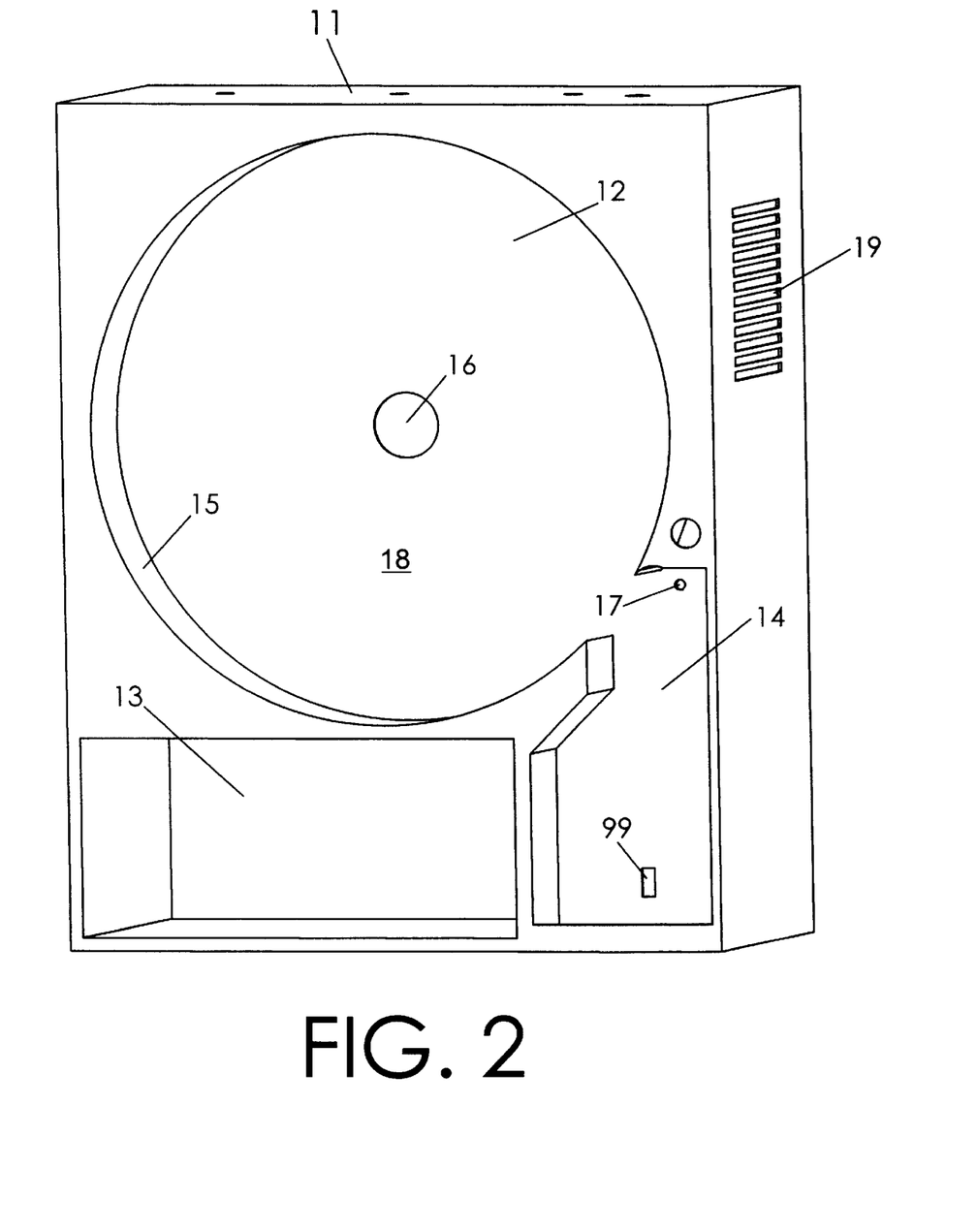
FIG. 2 is a perspective view of a cabinet.

A plan front view of a preferred embodiment of the present invention is shown in FIG. 1. FIG. 1 shows some major components of the preferred embodiment which include a cabinet 11, a pill-storage wheel 21, a programmable timer 41, a compartment indicator template 51, a pill release gate 61, a removable pill receptacle 71, and a door 81. FIGS. 2 to 8 show these major components in greater detail. A perspective view of cabinet 11 is shown in FIG. 2. As illustrated by FIG. 2, cabinet 11 has a pill-storage wheel housing 12 which is a cylindrical cavity with a cylindrical wall 15 and a cylindrical base 18. At the center of base 18 is a hole 16 to accommodate the shaft of pill-storage wheel 21. FIG. 2 also shows a pill discharge outlet 14 and a pill receptacle sensor switch 99 located in the area where the removable pill receptacle 71 resides. FIG. 2 also shows a speaker grille 19 and a store or storage compartment 13 for storing bulk pill supply containers.

Figure 3:
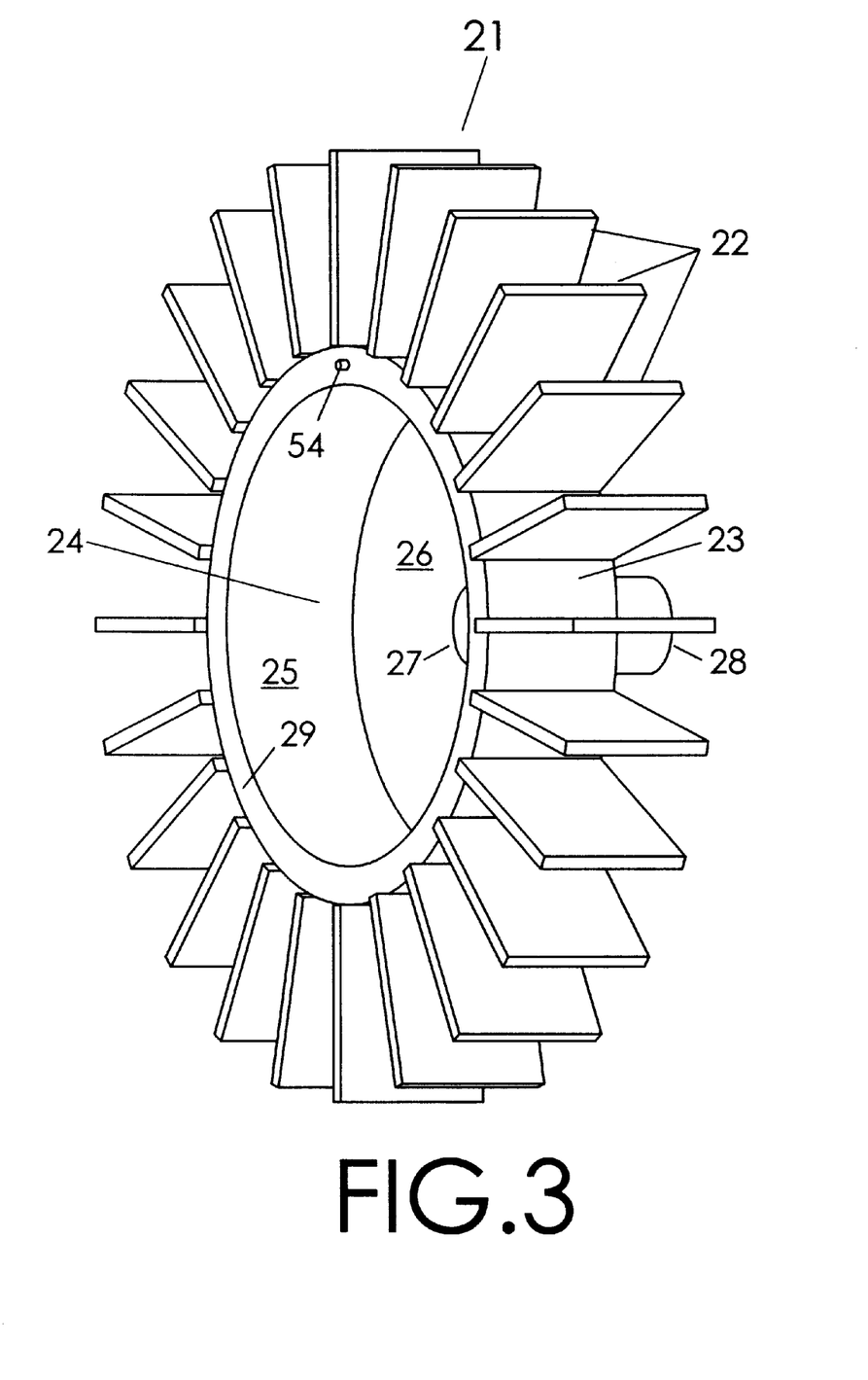
FIG. 3 is a perspective view of a pill-storage wheel.

A perspective view of the pill storage wheel 21 is shown in FIG. 3. As shown, pill-storage wheel 21 has a tubing or hollow shaft 28 which fits in hole 16 in cabinet 11. Shaft 28 will extend beyond undersurface 94 to attach to a spur gear 91 and an index gear 92 as shown in the plan back view of the preferred embodiment in FIG. 9. As shown in FIG. 3, pill-storage wheel 21 also has a cylindrical cavity 24 which is concentric to shaft 28. Cavity 24 is comprised of a cylindrical base 26 and an inner cylindrical wall 25. At the center of base 26 is a hole 27 which extends through the base and shaft 28. Exterior to cavity 24 is an outer cylindrical wall 23 and a plurality of vanes 22 which radiate from cylindrical wall 23 as shown in FIG. 3. Pill-storage wheel 21 also has an annular surface 29 and a pin 54 for accommodating compartment indicator template 51. The dimensions of pill-storage wheel 21 are sized so that it will fit in pill-storage wheel housing 12 snugly but will still rotate freely. Reference numerals 38 and 39 on FIG. 1 depict two compartments of a series of pill-storage compartments that is created when pill-storage wheel 21 is seated in the pill-storage wheel housing of the cabinet.

Figure 4:
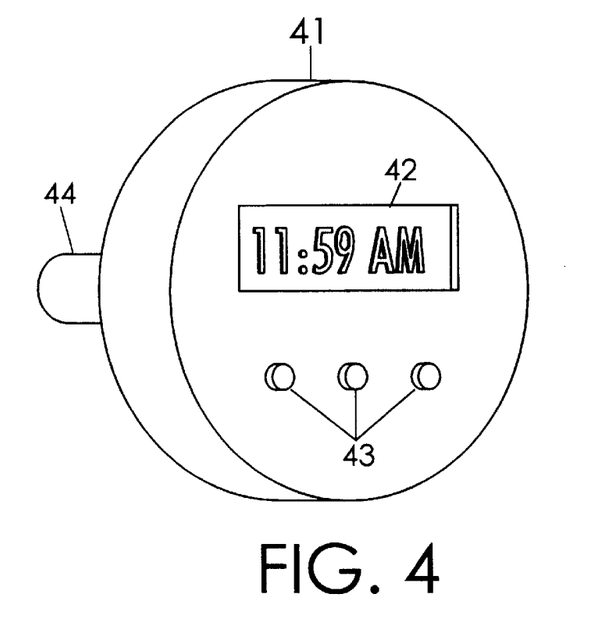
FIG. 4 is a perspective view of a timer.
Figure 9:
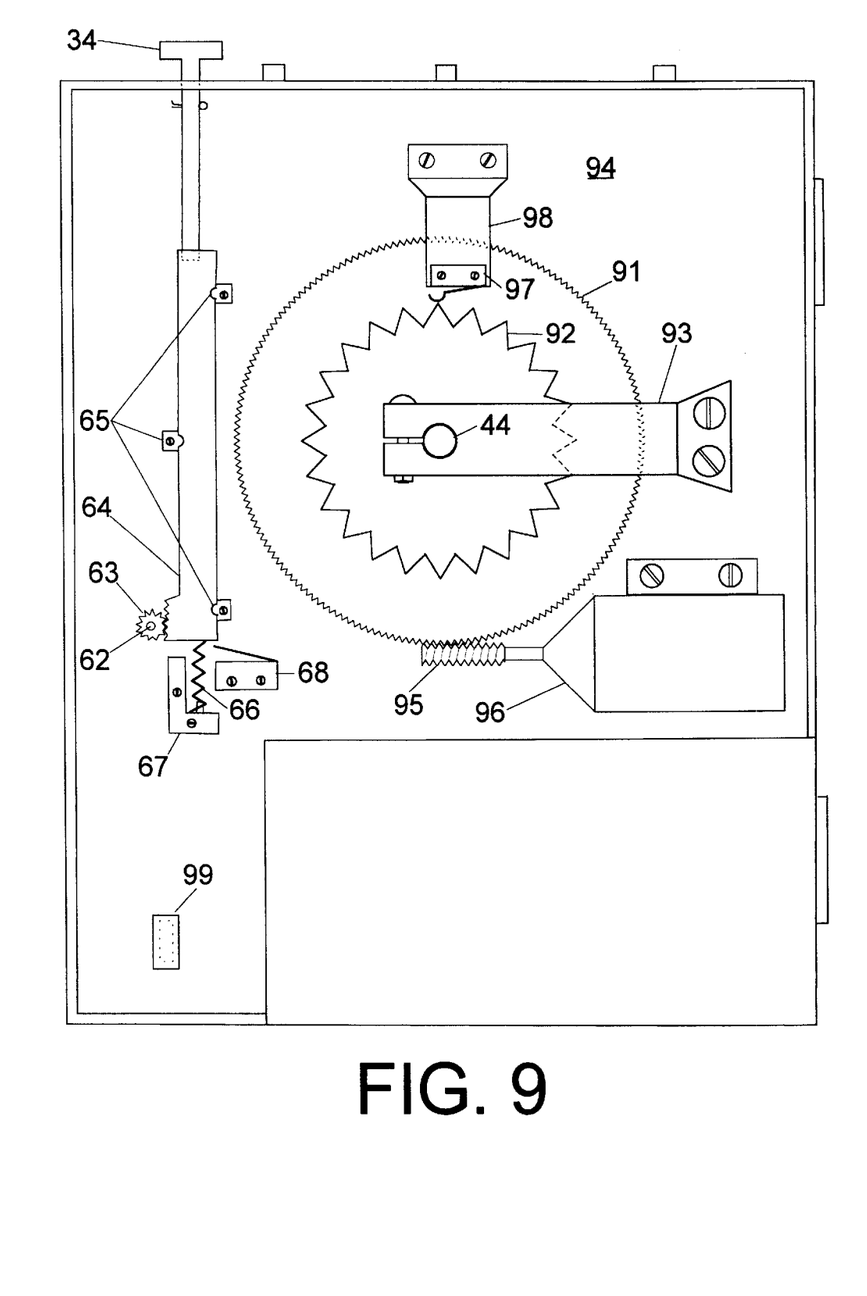
FIG. 9 is a plan back view of the preferred embodiment.

Cavity 24 accommodates a programmable timer 41 which is shown in perspective view in FIG. 4. Timer 41 has a readout display 42, adjustment push buttons 43, and a mounting shaft 44. Shaft 44 fits through hole 27 of cavity 24 and shaft 44 is held by a bracket 93 which is affixed to surface 94 as shown in FIG. 9. Bracket 93 is shaped so that it will not interfere with the movement of gears 91 and 92. The dimensions of timer 41 are such that the timer will fit in cavity 24 and not interfere with the rotation of pill-storage wheel 21 while timer 41 is held stationary in cavity 24. Timer 41 is a real time clock that is able to display the time of day, and has one or more alarm time registers which may be programmed for issuing an electrical signal at a programmed preset time.

Figure 5:
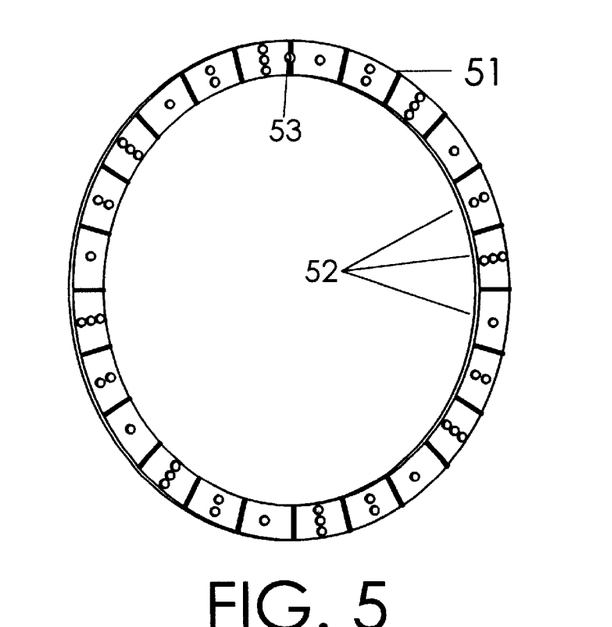
FIG. 5 is a perspective view of a compartment indicator template.
Figure 6:
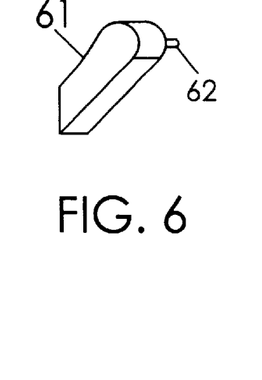
FIG. 6 is a perspective view of a pill-release gate.
Figure 7:
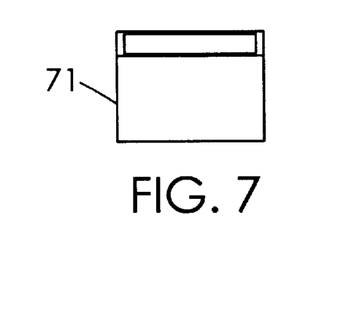
FIG. 7 is a perspective view of a removable pill receptacle.
Figure 8:
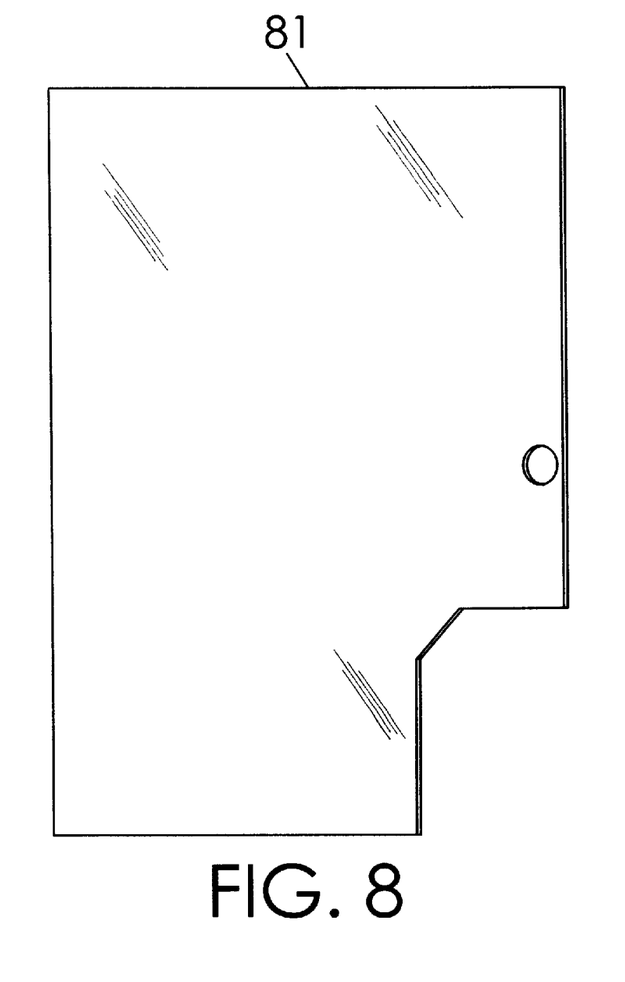
FIG. 8 is a perspective view of a door for the cabinet in FIG. 1.

FIG. 5 shows a perspective view of the compartment indicator template 51. Template 51 has a series of identifying indicia 52 and a hole 53 to fit over pin 54 when template 51 is seated on annular surface 29 of pill-storage wheel 21. FIG. 6 is a perspective view of pill release gate 61 which has a shaft 62 that goes through hole 17 of cabinet 11. FIG. 7 is a perspective view of removable pill receptacle that resides in front of sensor switch 99 in cabinet 11. FIG. 8 is a perspective view of door 81 which is held on cabinet 11 with hinges 32 and a door lock 33.

When the above components are properly sized and assembled together, a frontal view of the complete assembly will look like FIG. 1. Also shown in FIG. 1 are a pill alert indicator LED 35, a pill refill indicator LED 36, a low battery indicator LED 37, and a pill-release push button 34.

Looking at FIG. 9 again, push button 34 is connected to a rack gear 64 which engages pinion gear 63 that is affixed to gate shaft 62. Rack 64 is guided and held by rack guides 65 which are fastened to surface 94. Rack 64 also engages a rack return spring 66 which is held by a spring holder 67 that is fastened to surface 94. A stop alarm switch which is positioned for actuation by rack 64 is also fastened to surface 94.

As shown in FIG. 9, gear 91 which is attached to the pill-storage wheel shaft engages a worm gear 95 that is driven by the rotating shaft of a rotary motor 96. Gear 92 engages a motor interrupt switch 97 that is affixed to a bracket 98 which is fastened to surface 94. Switch 97 is actuated by the proturbances of gear 92. Bracket 98 is shaped so that it will not interfere with the movement of gear 91. Index gear 92 has radial teeth that correspond to the radial vanes of pill storage wheel 21. In the present example, pill-storage wheel 21 has twenty four equally spaced vanes; consequently, index gear 92 will have twenty four equally spaced teeth. Index gear 92 is positioned and affixed to the shaft of pill-storage wheel 21 so that when a tooth of index gear 92 actuates interrupt switch 97 as shown in FIG. 9, two vanes of a pill storage compartment (39) will register with pill release gate 61 as shown in FIG. 1; thus, index gear 92 will be coherently associated with pill-storage wheel 21.

Except for components such as the motor, electrical switches, and other hardware, most of the components of the preferred embodiment may be fabricated of plastic. Door 81 is preferably made of transparent plastic.

Figure 10:
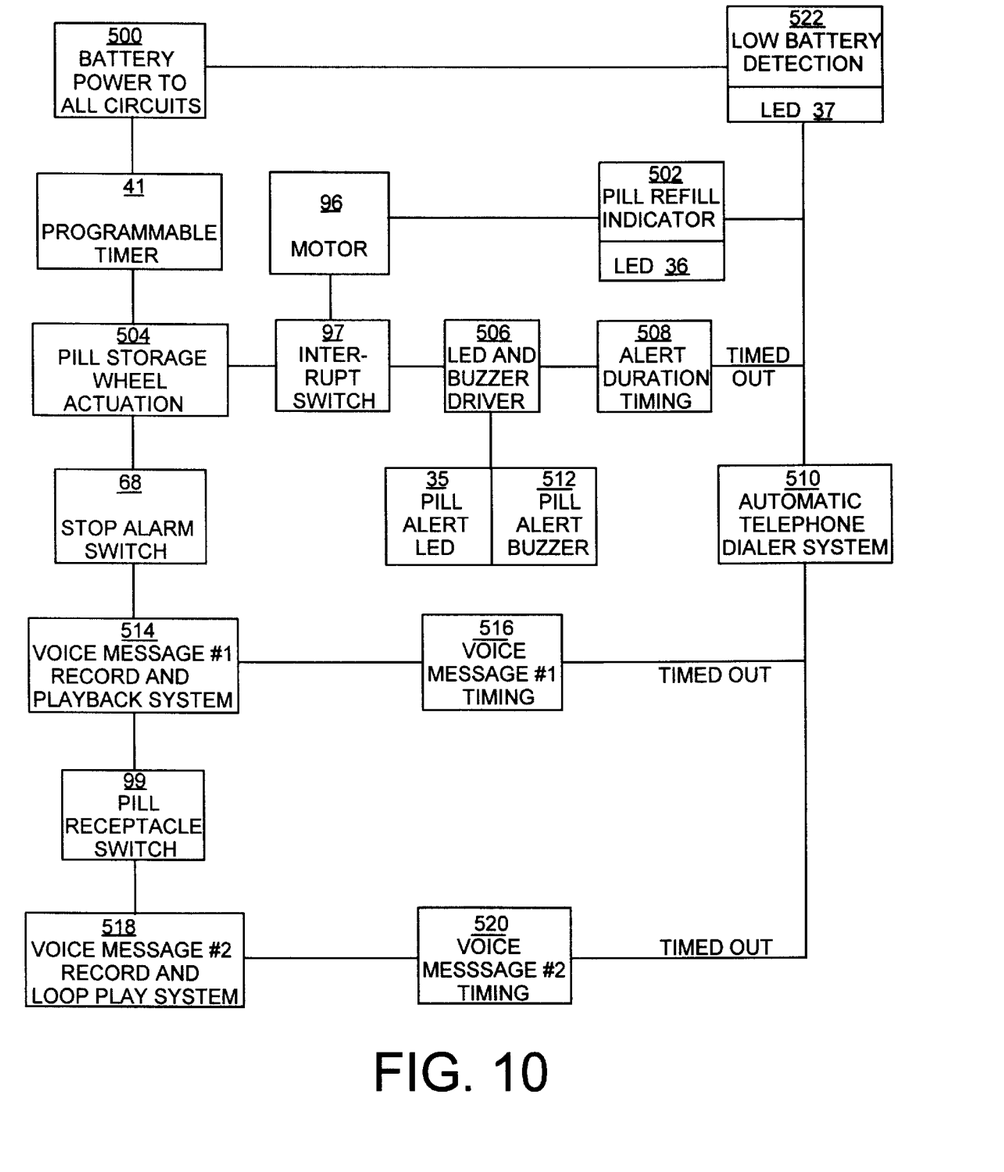
FIG. 10 is a block diagram of electronic circuitry.

DESCRIPTION OF ELECTRONIC CIRCUITRY—FIG. 10

The construction of the required circuits for the preferred embodiment is not described in detail because there are numerous ways a circuit may be designed to achieve a particular function or objective. A person proficient in the art should not have any difficulty in designing the required circuits. Only the functions, objectives, and interactions of the required circuits will be described herein. Looking at FIG. 10, a battery 500 supplies power to all of the circuits. The voltage of battery 500 is monitored by a low battery detection circuit 522 and a low battery condition is indicated by a LED 37. A low battery condition also activates an automatic telephone dialer system 510 comprising of a wireless transmitter that turns on a nearby detached automatic telephone dialer with a voice message record and playback circuit. A pill refill indicator circuit 502 contains circuitry which drives a blinking LED 36 and activates automatic telephone dialer system 510 after the circuitry has detected and counted a preset number of times motor 96 has been actuated. At programmed preset times, timer 41 activates a pill-storage wheel actuation circuit 504 to drive motor 96 via motor interrupt switch 97; the circuit preferably uses a silicon-controlled rectifier (SCR) to control electical current to the motor. Circuit 504 also has a manually operated switch for manually advancing the pill-storage wheel when needed. Timer 41 also turns on a blinking LED and buzzer driver circuit 506 and an adjustable alert duration timing circuit 508. Circuit 506 drives a blinking LED 35 and a buzzer 512. Circuit 508 keeps circuit 506 on unless it is interrupted by stop alarm switch 68. Circuit 508 provides for adjustment in the length of time that the pill alert system remains turned on, and if circuit 508 is timed out, circuit 508 will activate automatic telephone dialer system 510. If the momentary stop alarm switch 68 is actuated to turn off alert system circuit 506, it will also turn on a voice message record and playback system 514 to play a voice message #1 and activate a voice message #1 timing circuit 516. System 514 has capability to record a personal voice message and to playback the recorded message repeatedly in a loop fashion. If personal or customized voice messages are not needed, a simpler playback only system having standardized recordings of voice messages installed at the factory may be used instead. If timing circuit 516 is not interrupted by pill receptacle switch 99 and circuit 516 is timed out, it will activate the automatic telephone dialer system 510. When switch 99 is actuated, it will also turn on a voice message #2 circuit 518 and a timing circuit 520. The voice message #2 circuit 518 has recording and loop playback capabilities similar to the circuit of system 514. Circuits of 514 and 518 preferably use integrated circuits with electrically erasable programmable read-only memory (EEPROM) to store the voice message data in digitized form. If timing circuit 520 is not interrupted by switch 99 and is timed out, it will activate the automatic telephone dialer system 510. All of the above circuitry may be implemented with printed circuit boards located on the backside of cabinet 11, and the associated manual adjustment controls of the circuits may also be located at the back of the cabinet.

OPERATION OF THE PREFERRED EMBODIMENT

To initially use the preferred embodiment, the user needs to recharge or replace the battery if needed. Then the user programs timer 41 and loads pill-storage wheel 21 with the pills to be dispensed. This is done by laying the dispenser on its back and opening door 81 to gain access to the timer and the pill-storage wheel. Timer 41 is adjusted to the current time of day by manipulating push buttons 43; in addition, the preset times when pills are to be dispensed are programmed into timer 41 also by manipulating the push buttons 43.

The appropriate indicator template is installed to indentify each compartment of the pill storage-wheel with an indicium. Assume that three preset times for dispensing pills have been programmed into timer 41. In this case, a template with a repeating series of three different identifying indicia such as illustrated by reference numeral 51 should be installed as shown in FIG. 1. In sequential order, each idicium in the the series of three different indicia will be used to represent each preset time in the series of the three sequentially ordered preset times in this case. Since the needed pills to be dispensed at each preset time are known, the needed pills are loaded into each compartment of the pill-storage wheel identefed by the indicium associated with that preset time. Accordingly, all of the compartments are loaded with the proper pills. The method described in U.S. Pat. No. 5,915,589 (Lim, 1999) may be used to facilitate the accurate loading of pills into the pill-storage wheel.

When the pill loading is completed, the bulk supply containers of pills are stored in compartment 13 so that they will be readily available for the next reloading of pills; door 81 is closed and locked, and the automatic pill dispenser is returned to an upright position. Then the pill-storage wheel is synchronized as needed by manually operating the control switch of circuit 504 so that a loaded compartment which is identified with the indicium associated with the next impending preset time is moved to the position indicated by reference numeral 38 in FIG. 1. The automatic pill dispenser is now ready for use and is located in area that is convenient for the pill taker.

Referring again to FIG. 10, when the real time clock of timer 41 reaches a programmed preset time, the timer sends an electrical signal to activate pill-storage wheel actuation circuit 504 to deliver electrical current to motor 96. The timer signal also turns on circuit 506 which drives blinking LED 35 and buzzer 512. Motor 96 rotates the pill-storage wheel in a clockwise direction until motor interrupt switch 97 is actuated by index gear 92 to stop the current to motor 96. Since the index gear has 24 equally spaced teeth, the motor will rotate the pill storage wheel ¹⁄₂₄ of a revolution. This means that pill-storage compartment in the position indicated by reference numeral 38 will advance to the position of reference numeral 39 in FIG. 1. When motor 96 is not in operation, the arrested worm gear 95 will keep the pill-storage wheel from freely turning.

After the pill alert driver circuit 506 is activated by the signal from timer 41, the pill alert LED 35 and buzzer 512 will remain activated for a set length of time controlled by timing circuit 508 unless the pill taker operates push button 34 to actuate switch 68 to interrupt timing circuit 508 and turn off pill alert circuit 506. Timing circuit 508 may be adjusted to preset the pill alert duration in accordance with the wishes of the user and the constraints of the pill administration schedule.

If pill alert circuit 506 and timer circuit 508 are not deactivated by the pill taker operating push button 34, circuit 508 will activate an automatic telephone dialer system 510 when circuit 508 is timed out. The automatic telephone dialer is programmed with telephone numbers of some off-site caregivers who have been warned that they may receive a call from the automatic telephone dialer. The automatic telephone dialer is programmed with a recorded voice message stating that the pill taker has not responded to the automatic pill dispenser as required or there is a problem with the operation of the dispenser, and assistance to investigate the problem is needed. When activated, the automatic telephone dialer will dial the programmed telephone numbers until somebody answers at a dialed number and the automatic telephone dialer plays the recorded voice message.

If the pill taker does not respond to the pill alert and does not push push button 34, the pill(s) will not fall into the pill receptacle and will remain in the pill-storage wheel as a safeguard against overdose from too many pills accumulating in the pill receptacle. In addition, the caregiver or user will be able to see the pills that have not been dispensed by looking at the pill-storage wheel through the transparent door 81. Thus, data on non-compliance with the pill administration schedule will be available.

If the user does respond to the pill alert issued by the dispenser and pushes push button 34 to stop the blinking LED 35 and buzzer 512, the downward movement of push button 34 operates rack 64 and pinion 63 to open gate 61. The opening of gate 61 allows pills in the pill-storage compartment that is registered with the gate to fall by gravity into pill receptacle 71. The downward movement of push button 34 actuates switch 68 to also activate the voice message record and playback circuit 514 to play a previously recorded voice message #1 stored in circuit 514. The message may be used to remind the pill taker of special instructions in taking the dispensed pills, or to encourage a pill taker who is not interested in taking pills to take the dispensed pills. A different voice message may be provided at each preset time with additional circuitry. The following is an example of a voice message #1 made by a caregiver in her personal voice for her mother: "Mom, we love you and want you to stay healthy. Please take the pill cup from the machine and take your pills now with plenty of water and food." The voice message #1 will repeatedly emanate from acoustical outlet grille 19 of cabinet 11. Timing circuit 516 will loop play voice message #1 for a preset duration, say 10 minutes, unless it is interrupted by switch 99 that is actuated by the removal of pill receptacle 71 from the dispenser. If the pill receptacle is not removed and timing circuit 516 is timed out, circuit 516 will activate the automatic telephone dialer system 510 to call an off-site caregiver to investigate the problem.

The removal of the pill box to actuate switch 99 will also turn on voice message #2 circuit 518. Circuit 518 is capable of recording and playing back a voice message to remind the pill taker to replace the pill receptacle into the machine. For example, voice message #2 may say "Please take your pills and put the pill cup back in the machine so this message will stop." Timing circuit 520 will keep the voice message #2 loop playing until circuit 520 is timed out or is interrupted by switch 99 which is actuated when the pill receptacle is replaced into the cabinet. If circuit 520 is timed out, it will activate the automatic telephone dialer system 510 to call an off-site caregiver to investigate the problem.

The dispenser will continue to operate in the manner described above for each successive preset time until the last filled compartment of the pill-storage wheel has advanced to register with gate 61. Circuit 502 counts each time the pill storage wheel advances, and after a predetermined count, it will turn on the pill refill indicator LED 36 and activate the automatic telephone dialer to alert the need for refilling the pill-storage wheel. The pill dispenser will continue to automatically dispense the needed pills to the pill taker as long as it is kept filled with pills and the dispenser's battery is maintained.

When the voltage of battery 500 deteriorates to a level that will no longer meet the power requirements of the programmable automatic pill dispenser, low battery detection circuit 522 will turn on low battery indicator LED 37, and activate the automatic telephone dialer system 510 to alert the need for battery maintenance.

CONCLUSION, RAMIFICATIONS, AND SCOPE OF INVENTION

As seen from the preceding description, the dispenser involves a simple electromechanical system that can be programmed and loaded with appropriate pills so that the proper pill(s) in the proper amount(s) will be automatically dispensed with an alert signal for the pill taker at the proper time(s) each day. The dispenser also provides a system for providing personal voice messages to coach and assist the pill taker into properly taking the dispensed pills, and a system for alerting an off-site caregiver when dispensed pills are not taken by the pill taker or there is a problem in the operation of the dispenser. Some other advantages of the dispenser include:

a) the pill-storage wheel rotates only at preset time(s) for dispensing of pill(s);

b) it has a mechanism for preventing an accumulation of dispensed pills to minimize the possibility of overdosing; and c) it has an indicator that signifies when the pill-storage wheel needs refilling.

The possible variations and ramifications of the present invention are numerous. For example, a programmable analog mechanical type timer instead of the digital solid state timer shown in the preferred embodiment may be used. In another variation, the removable pill receptacle can be omitted. In this case, the dispenser is designed so that the user may place a hand under the pill release gate in the vicinity of a fixed pill receptacle to catch the pills as the user opens the gate, or manually scoop out the pills from the fixed receptacle after they are discharged into the fixed receptacle.

A variation for detecting the removal of a dispensed pill from the dispenser is the use of an electronic motion or proximity detector, or a light beam interruption device to sense the fingers of an user in retrieving the dispensed pill from the dispenser. Also, these alternate sensors or detection devices combined with an index wheel designed to interact with the selected sensor may be used in lieu of the motor interrupt switch and index gear shown in the preferred embodiment; for example, the index wheel may be disk with a series of concentric holes and the sensor may be a light beam on one side of the disk and a light detector on the other side of the disk.

One ramification is the use of a modified pill-storage wheel that has more structure for reducing the need for close gaps to minimize jams due to small pills wedging in the clearance gaps between the pill-storage wheel vanes and the housing. The modified pill-storage wheel is like the pill-storage wheel of the preferred embodiment except it has two thin flat annular disks additionally attached so that all the radial edges of the vanes on both faces of the pill-storage wheel are covered by the annular disks which rotate with the modified wheel. With this modification, only the gaps between the vane edges at the outer circumference of the pill-storage wheel and the cylindrical wall of the pill-storage wheel housing will need to be close, and any potential for jams will be minimal. To use this modified pill-storage wheel, the annular disk next to the cabinet door must be removable to provide access for loading of pills into the pill-storage compartments. Another ramification is the use of a detent mechanism to keep the index gear of the preferred embodiment from freely turning when the motor is not in operation. With the detent mechanism, a spur gear may be used in lieu of the worm gear shown in the preferred embodiment.

Other ramifications and variations of the basic concept which have not been described will be apparent to those skilled in the art. It is intended that all such ramifications and variations be included within the scope of the appended claims and their legal equivalents, and the scope of the invention not be limited by the examples given.

I claim:

1. A method of automatically dispensing a preselected pill and alerting a user to take said preselected pill at a preset time, comprising:

(a) providing a programmable timer, (b) programming said programmable timer to transmit a signal at said preset time, (c) providing a series of moveable pill-storage compartments and an outlet, each compartment of said series being able to receive at least one pill and discharge said pill by gravity into said outlet when said compartment moves into registration with said outlet, (d) providing and associating a store of pills with said series of moveable pill-storage compartments, said store of pills being a cabinet holding one or more pill-supply container of preselected pills to be dispensed, (e) obtaining said preselected pill from said store and loading a compartment of said series with said preselected pill to provide a loaded compartment, (f) providing an actuation means for automatically moving said loaded compartment into registration with said outlet in response to said signal from said programmable timer, and (g) providing an alarm to alert said user to take the pill that is discharged, said alarm being activated when said loaded compartment moves into registration with said outlet.

2. The method of claim 1 wherein said actuation means comprises a rotary motor driving said series of moveable pill-storage compartments and a sensor interacting with an index wheel coherently associating with said series.

3. The method of claim 1, further including providing a pill-refill indicator to alert the need to refill said series of moveable pill-storage compartments with preselected pills.

4. The method of claim 3 wherein said providing a pill-refill indicator comprises:
   (a) providing a counting means for detecting a predetermined quantity of loaded compartments of said series which have moved into registration with said outlet and transmitting a signal when said predetermined quantity has been detected,
   (b) providing an indicator means for alerting the need to refill said series of moveable pill-storage compartments, said indicator means being activated in response to said signal from said counting means, and
   (c) detecting said predetermined quantity of said loaded compartments and transmitting a signal by said counting means to activate said indicator means to alert the need to refill said series of moveable pill-storage compartments with preselected pills.

5. The method of claim 1, further including providing a control for said user to govern the discharge of a pill from said outlet.

6. The method of claim 5 wherein said providing a control comprises:
   (a) providing a gate means associated with said outlet for preventing the discharge of a pill through said outlet until said gate means is actuated,
   (b) providing an alert means for alerting said user to actuate said gate means, said alert means replacing said alarm, and
   (c) actuating said gate means by said user in response to said alert means to allow the discharge of said pill.

7. The method of claim 1, further including providing at least one voice message for said user.

8. The method of claim 7 wherein said providing at least one voice message comprises:
   (a) providing a voice message record and playback system,
   (b) recording a voice message for said user on said voice message record and playback system, and
   (d) automatically activating said voice message record and playback system to playback said voice message, said voice message replacing said alarm or playing back after said alarm.

9. The method of 8 wherein said voice message record and playback system is a playback only voice message system, said playback only voice message system having a factory installed voice message recording.

10. The method of claim 6, further including providing a remote alert when said user does not actuate said gate means within a predetermined duration after said alert means is activated.

11. The method of claim 10 wherein said remote alert is provided by:
   (a) providing an automatic telephone dialer system,
   (b) programming said automatic telephone dialer system with a telephone number of a person other than said user who will be available to respond to an alert voice message from said automatic telephone dialer system,
   (c) recording said alert voice message on said automatic telephone dialer system,
   (d) providing a circuit means for automatically activating said automatic telephone dialer system when said predetermined duration expires and said user did not actuate said gate means, and
   (e) automatically activating said automatic telephone dialer system to dial the telephone number of said person and play the recorded alert voice message when said predetermined duration expires and said gate means was not actuated.

12. The method of claim 6, further including alerting a person when said user actuates said gate means but does not take the preselected pill that is discharged.

13. The method of claim 12, wherein said alerting said person is provided by:
   (a) providing a removable pill receptacle at said outlet to receive the preselected pill that is discharged,
   (b) providing a sensing means for detecting the removal of said removable pill receptacle,
   (c) providing a circuit means for automatically activating said automatic telephone dialer system when said sensing means does not detect the removal of said removable pill receptacle within a predetermined time interval after said gate means has been actuated by said user in response to said alert means, and
   (d) automatically activating said automatic telephone dialer system to dial the telephone number of said person and play the recorded alert voice message to said person answering the telephone when said sensing means does not detect the removal of said removable pill receptacle within said predetermined time interval.

14. The method of claim 13, further including providing at least one voice message to coach said user to replace said removable pill receptacle after taking the dispensed pills from said removable pill receptacle.

15. The method of claim 14 wherein said providing at least one voice message comprises:
   (a) providing a system for recording and playing back said voice message,
   (b) recording said voice message which instructs said user to replace said removable pill receptacle after taking the dispensed pills on said system,
   (c) providing a detecting means for detecting the replacement of said removable pill receptacle,
   (d) providing a circuit means for automatically activating said system to playback said voice message when said sensing means detects the removal of said removable pill receptacle, the playing of said voice message continuing for a preset duration unless said playing is interrupted before the expiration of said preset duration by said detecting means detecting the replacement of said removable pill receptacle, and
   (e) automatically activating said system to playback said voice message to instruct said user to replace said removable pill receptacle when said sensing means detects the removal of said removable pill receptacle.

16. The method of claim 15, further including providing an off-site alert when said removable pill receptacle is not replaced within said preset duration.

17. The method of claim 16 wherein said providing an off-site alert comprises:
   (a) providing a circuit means for automatically activating said automatic telephone dialer system when said preset duration expires and said detecting means does not detect the replacement of said removable pill receptacle, and
   (b) automatically activating said automatic telephone dialer system to dial the telephone number of said person and play the recorded alert voice message to said person answering the telephone when said user does not replace said removable pill receptacle and said detecting means does not detect the replacement of said removable pill receptacle within said preset duration.

18. A programmable automatic pill dispenser comprising:
(a) a cabinet having a series of moveable pill-storage compartments, a pill-supply storage compartment, and a pill outlet,
(b) each compartment, of said series being able to receive at least one pill and being able to move into registration with said pill outlet to discharge said pill by gravity via said pill outlet,
(c) said pill outlet positioned to discharge said pill by gravity from said each compartment when said each compartment moves into registration with said pill outlet,
(d) an actuation means for moving in sequential order the corresponding pill-storage compartment of said series into registration with said pill outlet each time said actuation means is activated,
(e) an alarm means for alerting a user to take the discharged pill, and
(f) a programmable timing means for programming preset times for dispensing preselected pills and enabling the activation of said actuation means and said alarm means at each programmed preset time.

19. The dispenser of claim 18, further including an identification means for identifying each compartment of said series, said identification means comprises a label displaying a distinctive indicant for each preset time for association with each corresponding pill-storage compartment of said series.

20. The dispenser of claim 18, further including a pill-release gate associated with said pill outlet for keeping any pill in the pill-storage compartment that has moved into registration with said pill outlet until said user actuates said pill-release gate to discharge said pill by gravity through said pill outlet.

21. The dispenser of claim 20, further including a signal means for alerting said user to actuate said pill-release gate to discharge said pill, said signal means replacing said alarm means and being activated for a predetermined time interval or until said user actuates said pill-release gate before the expiration of said predetermined time interval.

22. The dispenser of claim 21, further including a voice message means for providing information to said user, said voice message means comprising a voice message record and playback system with a recorded voice message providing said information and said system being activated to playback said recorded voice message for a predetermined time interval when said user actuates said pill-release gate in response to said signal means.

23. The dispenser of claim 21 wherein said voice message means comprises a playback only voice message system having a recording providing said information and said playback only system being activated to playback said recording for a predetermined time interval when said user actuates said pill release gate in response to said signal means.

24. The dispenser of claim 21, further including a remote alert means for alerting a person other than said user that said user has not responded to said signal means by actuating said pill-release gate before the expiration of said predetermined time interval, and said remote alert means including an automatic telephone dialer system capable of automatically dialing a programmed telephone number to reach said person and playback a recorded alert voice message for said person.

25. The dispenser of claim 21, further including a remote alert device for alerting said person when said user actuates said pill-release gate device in response to the alert from said signal means, but does not take the discharged pill within a predetermined duration.

26. The dispenser of claim 25 wherein said remote alert device comprises:
(a) a removable pill receptacle associated with said pill outlet,
(b) a sensing means for detecting the removal of said removable pill receptacle, and
(c) a circuit means for automatically activating said automatic telephone dialer system when said sensing means does not detect the removal of said removable pill receptacle within said predetermined duration after said pill-release gate has been actuated by said user in response to said signal means, whereby providing a telephonic alert voice message to said person when said user did not remove said removable pill receptacle to take the dispensed pills.

27. The dispenser of claim 18, wherein said series of moveable pill-storage compartments comprises a rotatable pill-storage wheel having a series of pill-storage compartments disposed concentrically about the center axis of said wheel.

28. The dispenser of claim 27 wherein said actuation means comprises a rotary motor driving said pill-storage wheel and a sensor interacting with an index wheel coherently associating with said pill-storage wheel.

29. The dispenser of claim 28 wherein said actuation means further comprises:
(a) said index wheel having circumferential teeth angularly displaced in correspondence with said pill storage compartments of said pill storage wheel,
(b) said sensor being a motor interrupt switch engaging said index wheel,
(c) a worm gear associating with said rotary motor, and
(d) a spur gear associating with said pill-storage wheel and engaging said worm gear.

30. A programmable automatic pill dispenser comprising:
(a) a cabinet having a series of moveable pill-storage compartments, a compartment for holding one or more pill-supply container of preselected pills to be dispensed, and a pill outlet,
(b) each pill-storage compartment of said series being able to receive at least one pill and being able to move into registration with said pill outlet to discharge said pill by gravity via said pill outlet,
(c) said pill-outlet positioned to discharge said pill by gravity from said each compartment when said each compartment moves into registration with said pill outlet,
(d) an actuation means for moving in sequential order the corresponding pill-storage compartment of said series into registration with said pill outlet each time said actuation means is activated,
(e) a voice message means for recording and playing back voice messages, and
(f) a programmable timing means for programming preset times for dispensing preselected pills and enabling the activation of said actuation means and voice message means at each programmed preset time.

31. The dispenser of claim 30 wherein said voice message means comprises a voice message playback only system with an already installed voice message.

32. The dispenser of claim 30 further including a remote alert means for alerting an off-site person.

* * * * *